(12) United States Patent
Wu et al.

(10) Patent No.: US 9,665,129 B1
(45) Date of Patent: May 30, 2017

(54) WATER-PROOF MODULE

(71) Applicants: Chien-Hsung Wu, Taipei (TW); Yang-Kai Chi, Taipei (TW)

(72) Inventors: Chien-Hsung Wu, Taipei (TW); Yang-Kai Chi, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/259,058

(22) Filed: Sep. 8, 2016

Related U.S. Application Data

(60) Provisional application No. 62/289,925, filed on Feb. 2, 2016.

(51) Int. Cl.
  *H04B 1/38* (2015.01)
  *G06F 1/16* (2006.01)
  *H04B 1/3888* (2015.01)

(52) U.S. Cl.
  CPC .......... *G06F 1/1656* (2013.01); *G06F 1/1688* (2013.01); *H04B 1/3888* (2013.01); *H04B 2001/3894* (2013.01)

(58) Field of Classification Search
  CPC ... G06F 1/1656; G06F 1/1688; H04B 1/3888; H04B 2001/3894
  See application file for complete search history.

(56) References Cited

U.S. PATENT DOCUMENTS

| 2011/0211300 A1* | 9/2011 | Mori | G06F 1/1656 361/679.01 |
| 2013/0112534 A1 | 5/2013 | Harada et al. | |
| 2013/0299324 A1* | 11/2013 | Kanbayashi | H01H 9/04 200/302.1 |
| 2015/0235785 A1 | 8/2015 | Koepsell | |

* cited by examiner

*Primary Examiner* — Nguyen Vo
(74) *Attorney, Agent, or Firm* — Jianq Chyun IP Office

(57) ABSTRACT

A water-proof module including a covering structure and a switch component is provided. The covering structure includes an appearance surface and is adapted to be disposed on a casing. The switch component is rotatably disposed in the covering structure and includes at least one through hole. The through hole includes two ends opposite to each other. The switch component is adapted to rotate in the covering structure to a connect state such that the two ends are aligned with the appearance surface and an electrical element inside the casing respectively, and the through hole is connected between the appearance surface and the electrical element. The switch component is adapted to rotate in the covering structure to a water-proof state such that the two ends are misaligned with the appearance surface and the electrical element and the switch component obstructs a path between the appearance surface and the electrical element.

11 Claims, 5 Drawing Sheets

WATER-PROOF MODULE

CROSS-REFERENCE TO RELATED APPLICATION

This application claims the priority benefit of U.S. provisional application Ser. No. 62/289,925, filed on Feb. 2, 2016. The entirety of the above-mentioned patent application is hereby incorporated by reference herein and made a part of this specification.

BACKGROUND OF THE INVENTION

Field of the Invention

The invention relates to a water-proof module, and in particular, a water-proof module including a switch component.

Description of Related Art

As the technology industry advances, hand-held devices such as tablet computers and smartphones are already common in the consumer market. Meanwhile, hand-held devices are gradually developed to be light in weight and small in size to enhance operability and portability of the hand-held devices.

Generally, the casing of a hand-held device includes holes corresponding to the receiver and the speaker. The diaphragm of the receiver and the speaker is connected to the outside via the corresponding holes for reception and transmission of audio signals. In terms of the water-proofing capacity of the receiver and the speaker, the diaphragm thereof may sustain a lower water pressure (e.g., a water pressure lower than 1.5 M or 2 M). However, a higher water pressure may result in breakage of the diaphragm. Furthermore, since the receiver and the speaker of the hand-held device need to be constantly unblocked in the sound channel, disposing habitually covered water-proof lids on the corresponding holes for water-proofing may seriously affect convenience in use thereof.

SUMMARY OF THE INVENTION

The invention provides a water-proof module capable of providing water-proofing effect for an electrical element in a hand-held device as well as convenience in use.

The water-proof module of the invention includes a covering structure and a switch component. The covering structure includes an appearance surface and is adapted to be disposed on a casing. The switch component is rotatably disposed in the covering structure and includes at least one through hole. The through hole includes two ends opposite to each other. The switch component is adapted to rotate in the covering structure to a connect state such that the two ends are aligned with the appearance surface and an electrical element inside the casing respectively, and the through hole is connected between the appearance surface and the electrical element inside the casing. The switch component is adapted to rotate in the covering structure to a water-proof state such that the two ends are misaligned with the appearance surface and the electrical element, and the switch component obstructs a path between the appearance surface and the electrical element.

In one embodiment of the invention, the covering structure includes an opening on the appearance surface and the switch component includes a pull portion. The pull portion protrudes into the opening to be exposed by the covering structure, and is adapted to receive a force to drive the switch component to rotate to the connect state and the water-proof state.

In one embodiment of the invention, a depth of the opening is greater than a height of the pull portion.

In one embodiment of the invention, the covering structure includes a covering body and an elastic seal component. The appearance surface is formed on the covering body, and the elastic seal component is disposed between the covering body, the switch component, and the casing.

In one embodiment of the invention, the covering body includes at least one aperture on the appearance surface, and the elastic seal component includes a first slot. The first slot is located between the electrical element and the switch component. When the switch component rotates to the connect state, the electrical element is connected to the outside via the first slot, the through hole, and the aperture.

In one embodiment of the invention, a cylindrical space is formed between the elastic seal component and the covering body, and at least a part of the switch component is in a cylindrical shape and is rotatably disposed in the cylindrical space.

In one embodiment of the invention, the water-proof module further includes a positioning component. The positioning component is disposed between the casing and the switch component and is adapted to position the switch component in the connect state and the water-proof state.

In one embodiment of the invention, the switch component includes a first positioning recess and a second positioning recess, and the positioning component includes a positioning protrusion. When the switch component rotates to the connect state, the first positioning recess engages with the positioning protrusion. When the switch component rotates to the water-proof state, the second positioning recess engages with the positioning protrusion.

In one embodiment of the invention, the water-proof module is adapted to be used in a hand-held device. The hand-held device includes the casing and the electrical element.

In one embodiment of the invention, the casing includes a second slot. The second slot is located between the electrical element and the water-proof module.

In one embodiment of the invention, the electrical element is an audio element and includes a diaphragm.

In light of the above, in the water-proof module of the invention, the switch component rotates in the covering structure to the connect state or the water-proof state. When the hand-held device is in a general use environment, the switch component may be rotated to the connect state. At this time, the electrical element (e.g., a receiver or a speaker) in the hand-held device is connected to the outside via the through hole and can function normally (e.g., receiving or making a call). When the hand-held device is in a use environment of high water pressure, the switch component may be rotated to the water-proof state. At this time, the electrical element is not connected to the outside due to obstruction of the switch component, and water-proofing effect is thereby achieved. Accordingly, it is not necessary to dispose a habitually covered water-proof lid to water-proof the electrical element, such that the normal function of the electrical element is not affected by the habitually covered water-proof lid, and convenience in use of the hand-held device is thereby enhanced.

To provide a further understanding of the aforementioned and other features and advantages of the invention, exemplary embodiments, together with the reference drawings, are described in detail below.

DESCRIPTION OF THE EMBODIMENTS

Figure 1:
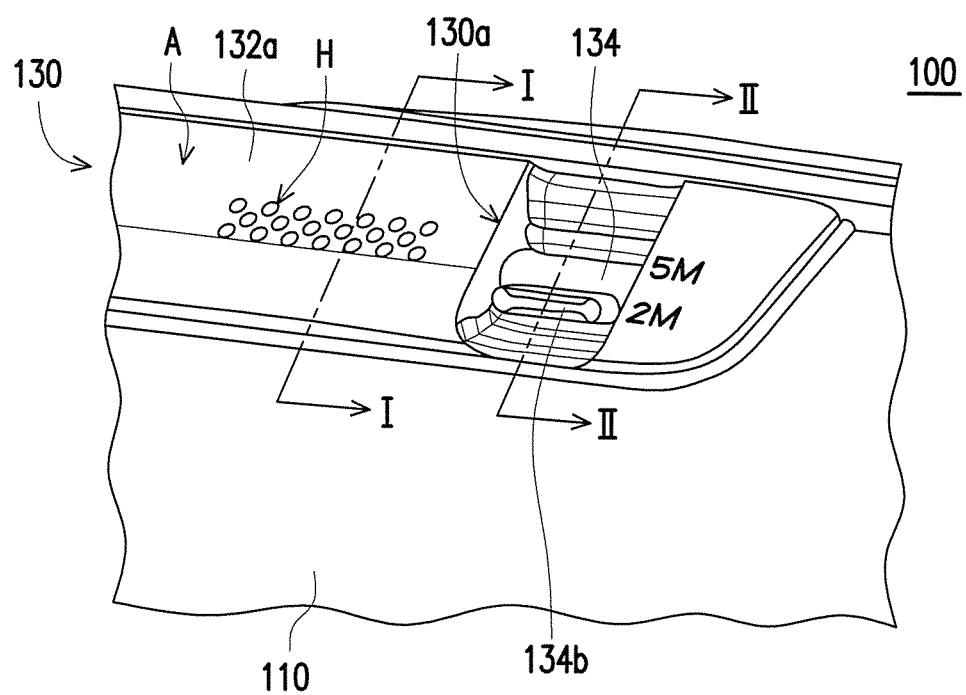
FIG. 1 is a partial perspective diagram of a hand-held device according to one embodiment of the invention.
Figure 2:
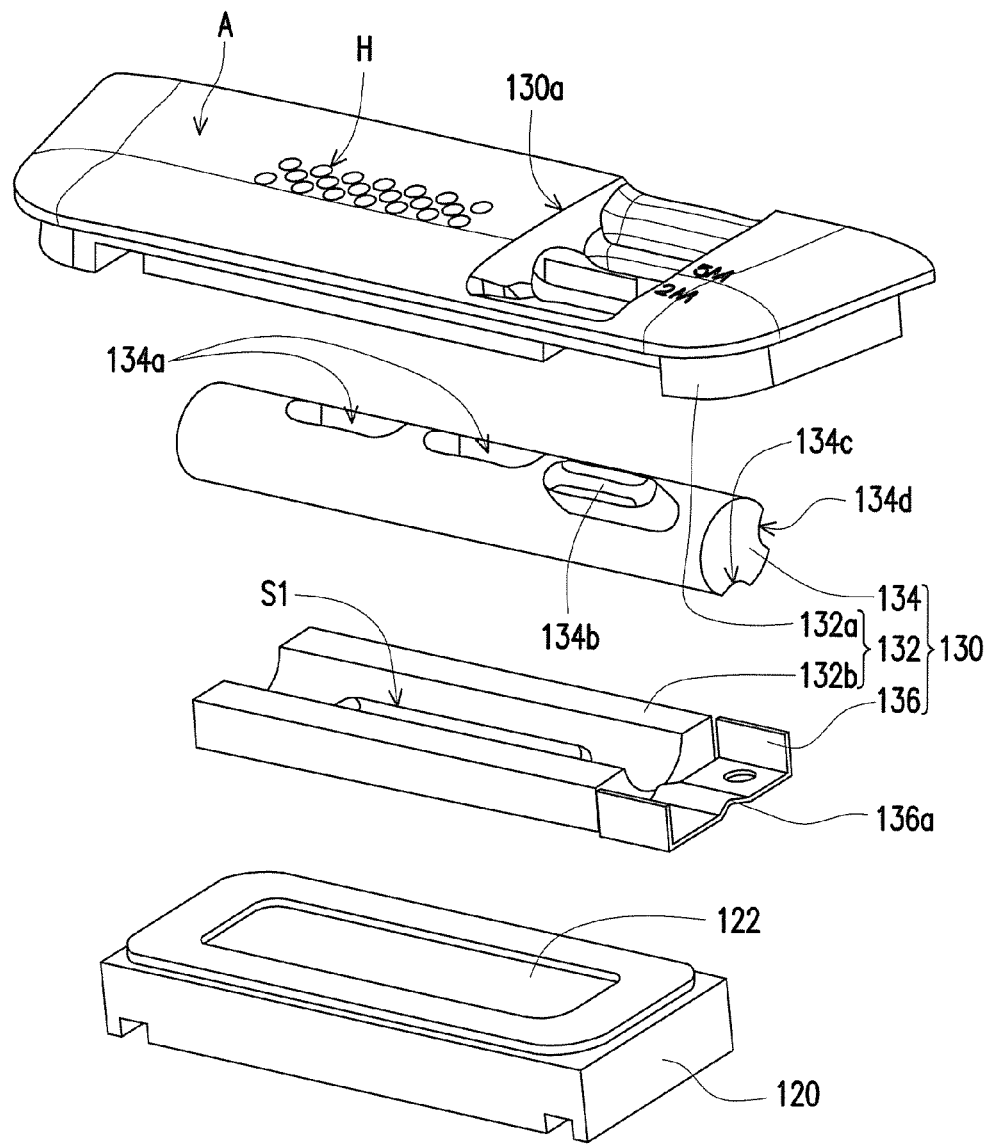
FIG. 2 is an exploded diagram of partial parts of the hand-held device of FIG. 1.
Figure 3:
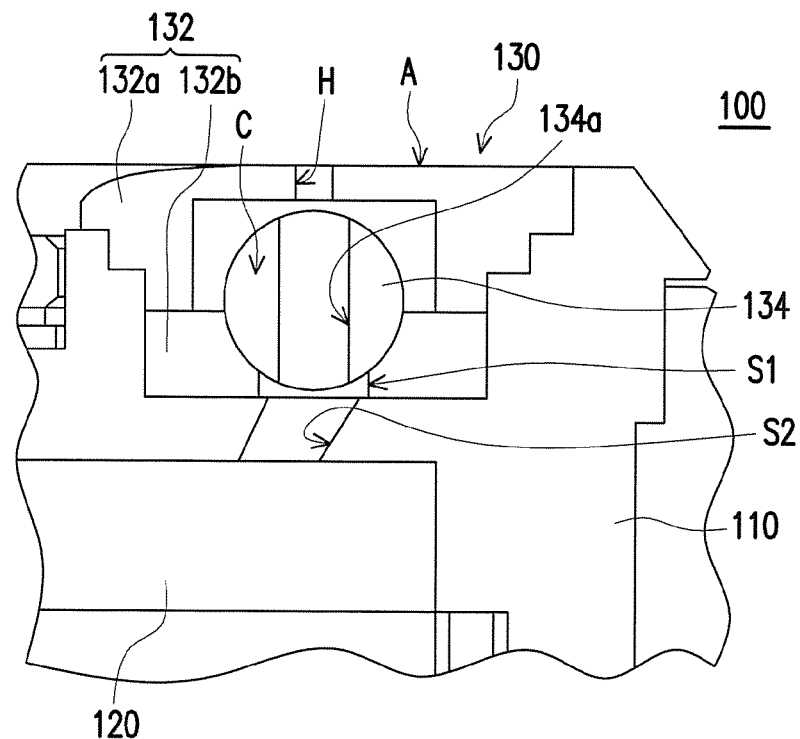
FIG. 3 is a cross-sectional diagram along a line I-I of the hand-held device of FIG. 1.

FIG. 1 is a partial perspective diagram of a hand-held device according to one embodiment of the invention. FIG. 2 is an exploded diagram of partial parts of the hand-held device of FIG. 1. FIG. 3 is a cross-sectional diagram along a line I-I of the hand-held device of FIG. 1. Referring to FIGS. 1 to 3, a hand-held device 100 of the present embodiment is, for example, a smartphone and includes a casing 110, an electrical element 120, and a water-proof module 130. The electrical element 120 is, for example, an audio element such as a receiver and is disposed in the casing 110. In other embodiments, the electrical element 120 may also be a speaker or an electrical element of other types, which shall not be limited in the invention. When the electrical element 120 is a receiver or a speaker, it usually includes a diaphragm 122 that vibrates according to an audio signal or vibrates to generate an audio signal. The water-proof module 130 is disposed corresponding to the electrical element 120 and is adapted to provide a water-proofing function for the electrical element 120 and its diaphragm 122, as detailed below.

The water-proof module 130 includes a covering structure 132 and a switch component 134. The covering structure 132 is disposed on the casing 110 and includes a covering body 132a and an elastic seal component 132b. The covering structure 132 includes an appearance surface A formed on the covering body 132a, and at least one aperture H is provided on the appearance surface A (FIGS. 1 and 2 illustrate a plurality of the aperture s). The elastic seal component 132b is disposed between the covering body 132a, the switch component 134, and the casing 110 and includes a first slot S1. The first slot S1 is located between the electrical element 120 and the switch component 134. The casing 110 includes a second slot S2. The second slot S2 is located between the electrical element 120 and the water-proof module 130.

The switch component 134 is rotatably disposed in the covering structure 132 and includes at least one through hole 134a (FIG. 2 illustrates two through holes). Specifically, in the present embodiment, a cylindrical space C (marked in FIG. 3) is formed between the elastic seal component 132b and the covering body 132a, and part of the switch component 134 is in a cylindrical shape and is rotatably disposed in the cylindrical space C. More specifically, as illustrated in FIG. 2, with respect to a section of the switch component 134 corresponding to the elastic seal component 132b, except for the part of the through hole 134a and a pull portion 134b, this section of the switch component 134 approximately fits the cylindrical structure of the cylindrical space C to be adapted to be rotatably disposed in the cylindrical space C along an axial direction of the cylindrical structure. In other embodiments, the switch component 134 may be disposed to rotate in the covering structure 132 by means of other adequate methods and structures, which shall not be limited in the invention.

When the hand-held device 100 is in a general use environment, a user may rotate the switch component 134 in the covering structure 132 to a connect state as illustrated in FIGS. 1 to 3, such that the through hole 134a is connected between the appearance surface A and the electrical element 120. At this time, two opposite ends of the through hole 134a are aligned with the appearance surface A and the electrical element 120 respectively. The electrical element 120 is connected to the outside via the second slot S2 of the casing 110, the first slot S1 of the elastic seal component 132b, the through hole 134a of the switch component 134, and the apertures H of the covering body 132a to function normally (e.g., receiving a call).

Figure 4:
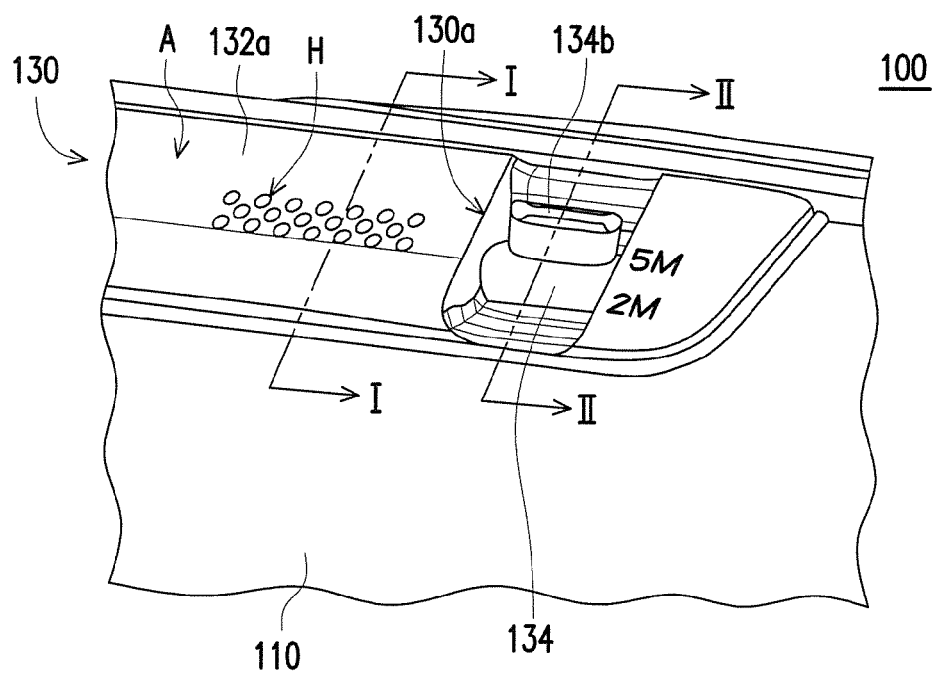
FIG. 4 illustrates rotation of a switch component of FIG. 1.
Figure 5:
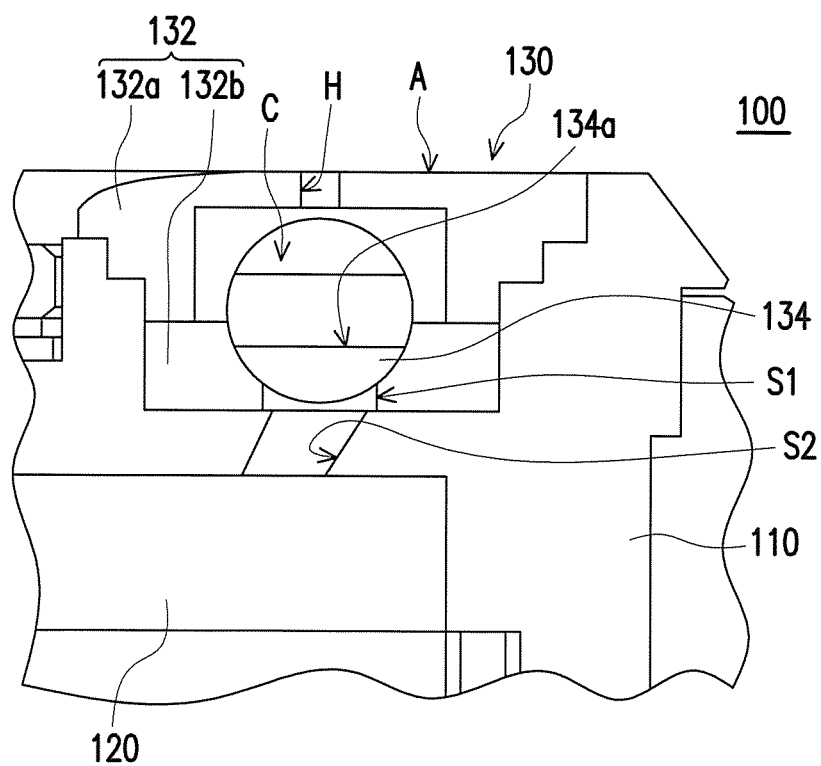
FIG. 5 is a cross-sectional diagram along a line I-I of the hand-held device of FIG. 4.

FIG. 4 illustrates rotation of the switch component of FIG. 1. FIG. 5 is a cross-sectional diagram along a line I-I of the hand-held device of FIG. 4. When the hand-held device 100 is in a use environment of high water pressure, the user may rotate the switch component 134 in the covering structure 132 to a water-proof state as illustrated in FIGS. 4 and 5. At this time, the opposite two ends of the through hole 134a are misaligned with the appearance surface A and the electrical element 120. The switch component 134 obstructs a path between the appearance surface A and the electrical element 120, such that the electrical element 120 is not connected to the outside due to obstruction of the switch component 134, and water-proofing effect is thereby achieved. Accordingly, it is not necessary to dispose a habitually covered water-proof lid to water-proof the electrical element 120, such that the normal function of the electrical element 120 is not affected by the habitually covered water-proof lid, and convenience in use of the hand-held device 100 is thereby enhanced. Moreover, designing the switch component 134 to operate by rotation as described above effectively reduces an operating path thereof (as compared with a push button that operates by translation, for example) to save a space for disposing the water-proof module 130 in the hand-held device 100.

In the present embodiment, a material of the elastic seal component 132b is, for example, rubber or another adequate water-proof elastic material, such that with its elastic deforming characteristics, it is initially designed for preload assembly to provide sealing effect between the casing 110, the covering body 132a, and the switch component 134 and prevent unexpected gaps from existing between the casing 110, the covering body 132a, and the switch component 134.

Referring to FIGS. 1, 2, and 4, in the present embodiment, the covering structure 130 includes an opening 130a on the appearance surface A of the covering body 132a, and the switch component 134 includes a pull portion 134b. The pull portion 134b protrudes into the opening 130a to be exposed by the covering structure 130. When the user applies a force to the pull portion 134b, the pull portion 134b receives the force and drives the switch component 134 to rotate to the connect state or the water-proof state. Furthermore, a depth of the opening 130a of the present embodiment is, for example, greater than a height of the pull portion 134b, such that the pull portion 134b does not protrude out of the opening 130a to prevent the user from flipping the pull portion 134b by mistake and to avoid discomfort resulting from contact between the ear of the user and the pull portion 134b.

Figure 6:
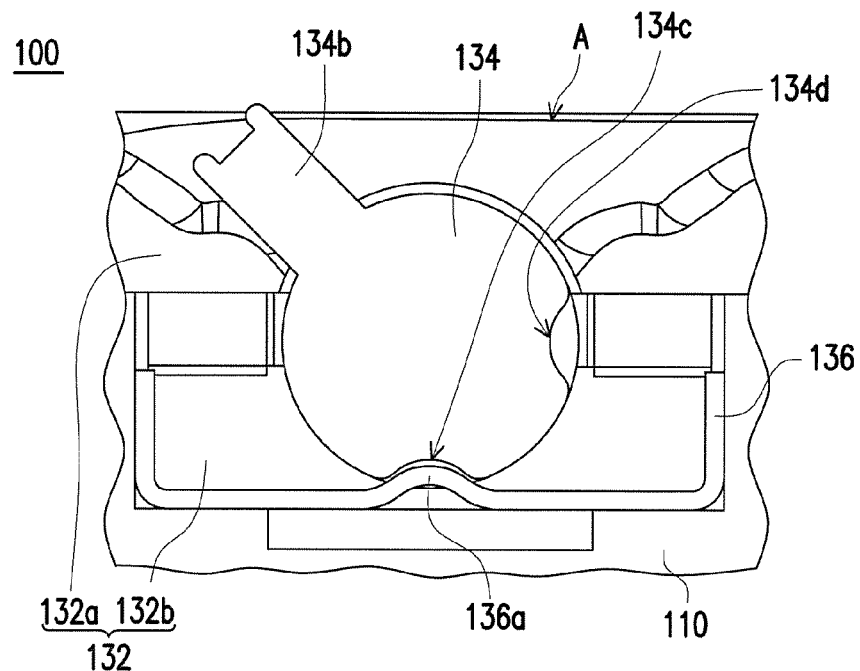
FIG. 6 is a cross-sectional diagram along a line II-II of the hand-held device of FIG. 1.
Figure 7:
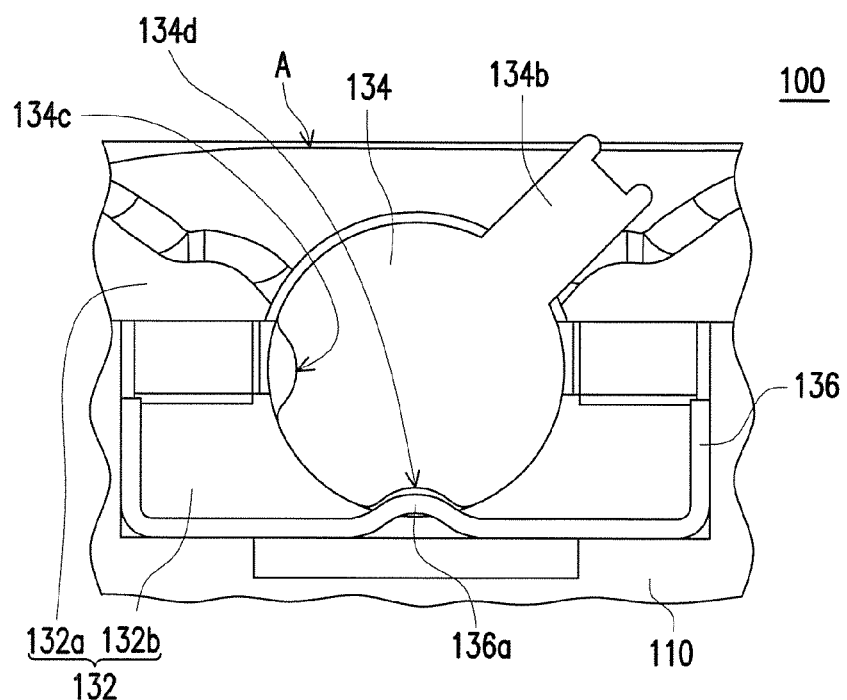
FIG. 7 is a cross-sectional diagram along a line II-II of the hand-held device of FIG. 4.

FIG. 6 is a cross-sectional diagram along a line II-II of the hand-held device of FIG. 1. FIG. 7 is a cross-sectional diagram along a line II-II of the hand-held device of FIG. 4. Referring to FIGS. 2, 6, and 7, the water-proof module 130 of the present embodiment further includes a positioning component 136. The positioning component 136 is, for example, a metal elastic piece and includes a positioning protrusion 136a provided between the casing 110 and the switch component 134. The switch component 134 includes a first positioning recess 134c and a second positioning recess 134d. When the switch component 134 rotates to the connect state as illustrated in FIGS. 1 and 3, the first positioning recess 134c engages with the positioning protrusion 136a as illustrated in FIG. 6 to position the switch component 134 in the connect state. When the switch component 134 rotates to the water-proof state as illustrated in FIGS. 4 and 5, the second positioning recess 134d engages with the positioning protrusion 136a as illustrated in FIG. 7 to position the switch component 134 in the water-proof state. The structural interference of the first positioning recess 134c and the positioning protrusion 136a and the structural interference of the second positioning recess 134d and the positioning protrusion 136a allow excellent operability for the user when operating the switch component 134 and can further avoid unexpected rotation of the switch component 134.

As illustrated in FIGS. 1 and 4, to enable the user to properly operate the switch component 134, the covering body 132a of the present embodiment may be marked with symbols or texts of the water-proof state (2 M and 5 M as illustrated respectively represent a water pressure of 2 M and a water pressure of 5 M), such that the user can properly operate the switch component 134 according to his/her needs. In other embodiments, the symbols or texts may be absent from the covering body 132a, or symbols or texts of other types may be used to guide the user to properly operate the switch component 134, which shall not be limited in the invention.

In summary of the above, in the water-proof module of the invention, the switch component rotates in the covering structure to the connect state or the water-proof state. When the hand-held device is in a general use environment, the switch component may be rotated to the connect state. At this time, the electrical element (e.g., a receiver or a speaker) in the hand-held device is connected to the outside via the through hole and can function normally (e.g., receiving or making a call). When the hand-held device is in a use environment of high water pressure, the switch component may be rotated to the water-proof state. At this time, the electrical element is not connected to the outside due to obstruction of the switch component, and water-proofing effect is thereby achieved. Accordingly, it is not necessary to dispose a habitually covered water-proof lid to water-proof the electrical element, such that the normal function of the electrical element is not affected by the habitually covered water-proof lid, and convenience in use of the hand-held device is thereby enhanced. Moreover, designing the switch component to operate by rotation as described above effectively reduces an operating path thereof to save a space for disposing the water-proof module. Furthermore, with its elastic deforming characteristics, the elastic seal component provides sealing effect between the casing, the covering body, and the switch component and prevents unexpected gaps from existing between the casing, the covering body, and the switch component.

Although the invention is disclosed in the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A water-proof module comprising:
   a covering structure comprising an appearance surface and adapted to be disposed on a casing; and
   a switch component rotatably disposed in the covering structure and comprising at least one through hole, wherein the through hole comprises two ends opposite to each other,
   the switch component is adapted to rotate in the covering structure to a connect state such that the two ends are aligned with the appearance surface and an electrical element inside the casing respectively and the through hole is connected between the appearance surface and the electrical element, and
   the switch component is adapted to rotate in the covering structure to a water-proof state such that the two ends are misaligned with the appearance surface and the electrical element and the switch component obstructs a path between the appearance surface and the electrical element.

2. The water-proof module according to claim 1, wherein the covering structure comprises an opening on the appearance surface, the switch component comprises a pull portion, and the pull portion protrudes into the opening to be exposed by the covering structure and is adapted to receive a force to drive the switch component to rotate to the connect state and the water-proof state.

3. The water-proof module according to claim 2, wherein a depth of the opening is greater than a height of the pull portion.

4. The water-proof module according to claim 1, wherein the covering structure comprises a covering body and an elastic seal component, the appearance surface is formed on the covering body, and the elastic seal component is disposed between the covering body, the switch component and the casing.

5. The water-proof module according to claim 4, wherein the covering body comprises at least one aperture on the appearance surface, the elastic seal component comprises a first slot, the first slot is located between the electrical element and the switch component, and when the switch component rotates to the connect state, the electrical element is connected to outside via the first slot, the through hole and the aperture.

6. The water-proof module according to claim 4, wherein a cylindrical space is formed between the elastic seal component and the covering body, and at least a part of the switch component is in a cylindrical shape and is rotatably disposed in the cylindrical space.

7. The water-proof module according to claim 1, further comprising a positioning component, wherein the positioning component is disposed between the casing and the switch component and is adapted to position the switch component in the connect state and the water-proof state.

8. The water-proof module according to claim 7, wherein the switch component comprises a first positioning recess and a second positioning recess, the positioning component comprises a positioning protrusion, when the switch component rotates to the connect state, the first positioning recess engages with the positioning protrusion, and when the switch component rotates to the water-proof state, the second positioning recess engages with the positioning protrusion.

9. The water-proof module according to claim 1, wherein the water-proof module is adapted to be used in a hand-held device, and the hand-held device comprises the casing and the electrical element.

10. The water-proof module according to claim 1, wherein the casing comprises a second slot, and the second slot is located between the electrical element and the water-proof module.

11. The water-proof module according to claim 1, wherein the electrical element is an audio element and comprises a diaphragm.

* * * * *